C. M. EBERLING.
CEMENT WORKING MACHINERY.
APPLICATION FILED OCT. 27, 1919.

1,407,846

Patented Feb. 28, 1922.
8 SHEETS—SHEET 6.

INVENTOR,
CHARLES M. EBERLING.
BY Hull Smith Brock & West
Attys.

C. M. EBERLING.
CEMENT WORKING MACHINERY.
APPLICATION FILED OCT. 27, 1919.

1,407,846.

Patented Feb. 28, 1922.
8 SHEETS—SHEET 7.

UNITED STATES PATENT OFFICE.

CHARLES M. EBERLING, OF CLEVELAND, OHIO, ASSIGNOR TO THE EBERLING MACHINERY COMPANY, OF CLEVELAND, OHIO, A CORPORATION OF OHIO.

CEMENT-WORKING MACHINERY.

1,407,846.  Specification of Letters Patent.  Patented Feb. 28, 1922.

Application filed October 27, 1919. Serial No. 333,472.

*To all whom it may concern:*

Be it known that I, CHARLES M. EBERLING, a citizen of the United States, residing at Cleveland, in the county of Cuyahoga and State of Ohio, have invented a certain new and useful Improvement in Cement-Working Machinery, of which the following is a full, clear, and exact description, reference being had to the accompanying drawings.

This invention relates to cement working machinery and particularly to machines for making hollow concrete blocks or tiles as shown in my patents of August 4, 1914, Nos. 1,106,088 and 1,106,089. The objects of the invention are the improvement of the driving and operating devices of such a machine; the provision of a machine of this character of simpler and more rugged construction than anything heretofore known and capable of more rapid operation; while further objects and advantages of the invention will appear as the description proceeds.

In the drawings accompanying and forming a part of this application, I have shown an operative machine embodying my improvements, although it will be understood that these views are illustrative only and do not limit me to the features of construction or arrangements shown therein except as the same are also recited in the claims hereto annexed. In these drawings, Fig. 2 is a front elevation thereof.

Figures 6, 13:
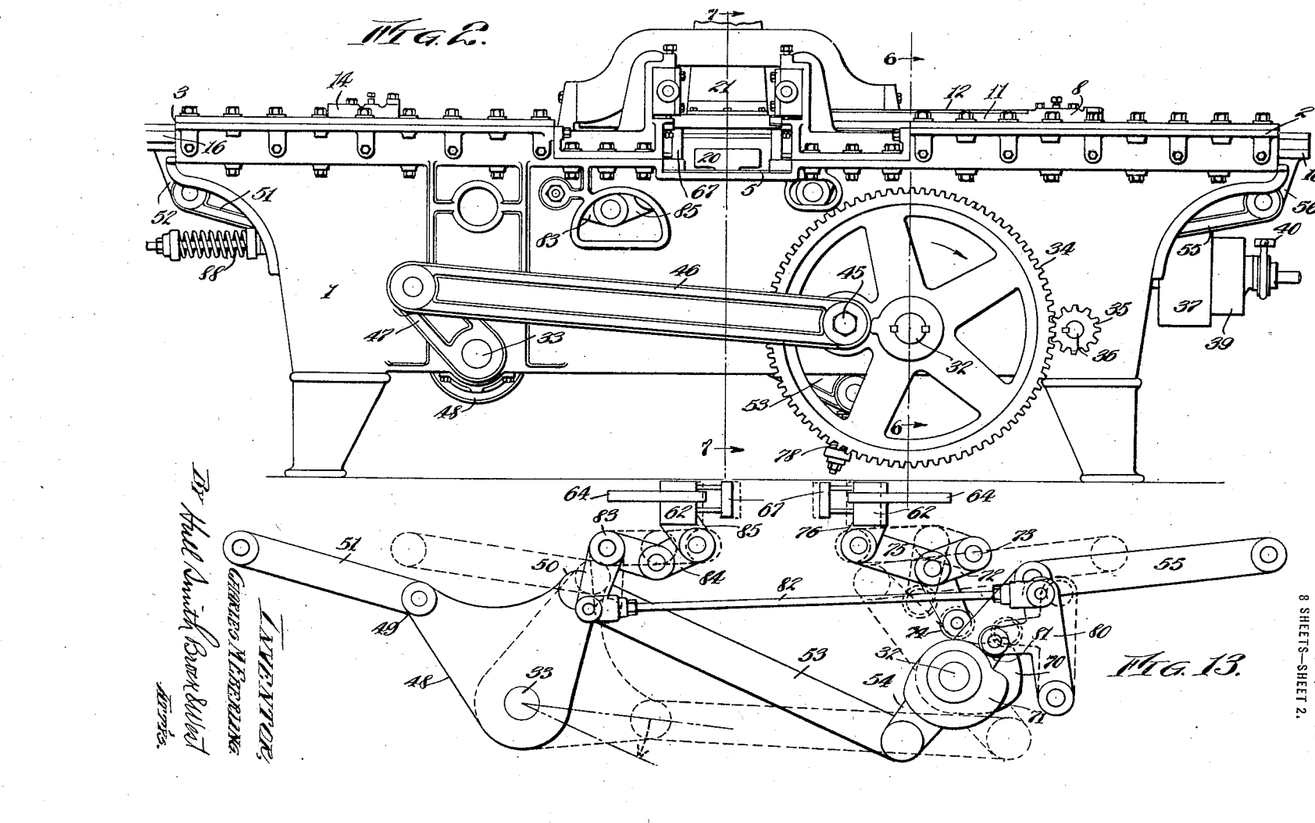
Figs. 6 and 7 are sectional views corresponding to the lines 6—6 and 7—7, respectively, of the previous views.
Fig. 13 is a diagrammatic view illustrating the phase-operation of the mechanism.
Figure 6:
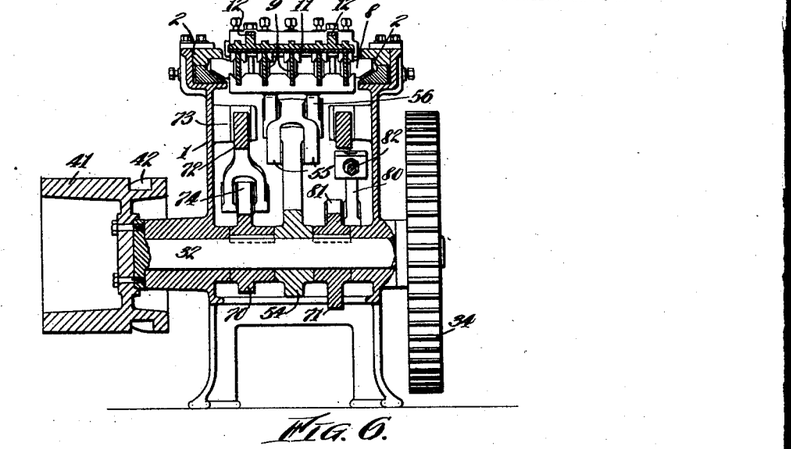

Describing by reference characters the parts shown in these drawings, 1 represents the supporting frame having a horizontal rectangular top formed at opposite ends with the longitudinal slideways 2 and 3 respectively whose preferred construction is detailed in Fig. 6. Traversing this frame transversely between these two slideways is the horizontal supporting plate 5 defined between lateral guides 6—6.

Slidingly mounted in the slideway 2—2 is a crosshead 8 to the forward face of which are attached a plurality of parallel longitudinal piercing elements such as the knives 9 and from whose rearward side projects the steadying plate 10. Rigidly secured to the upper edges of the knives is a cover plate 11 (shown to the best advantage in Fig. 12) whose forward end projects beyond the knives and whose upper surface is provided with rollways 12—12.

Figures 11, 12:
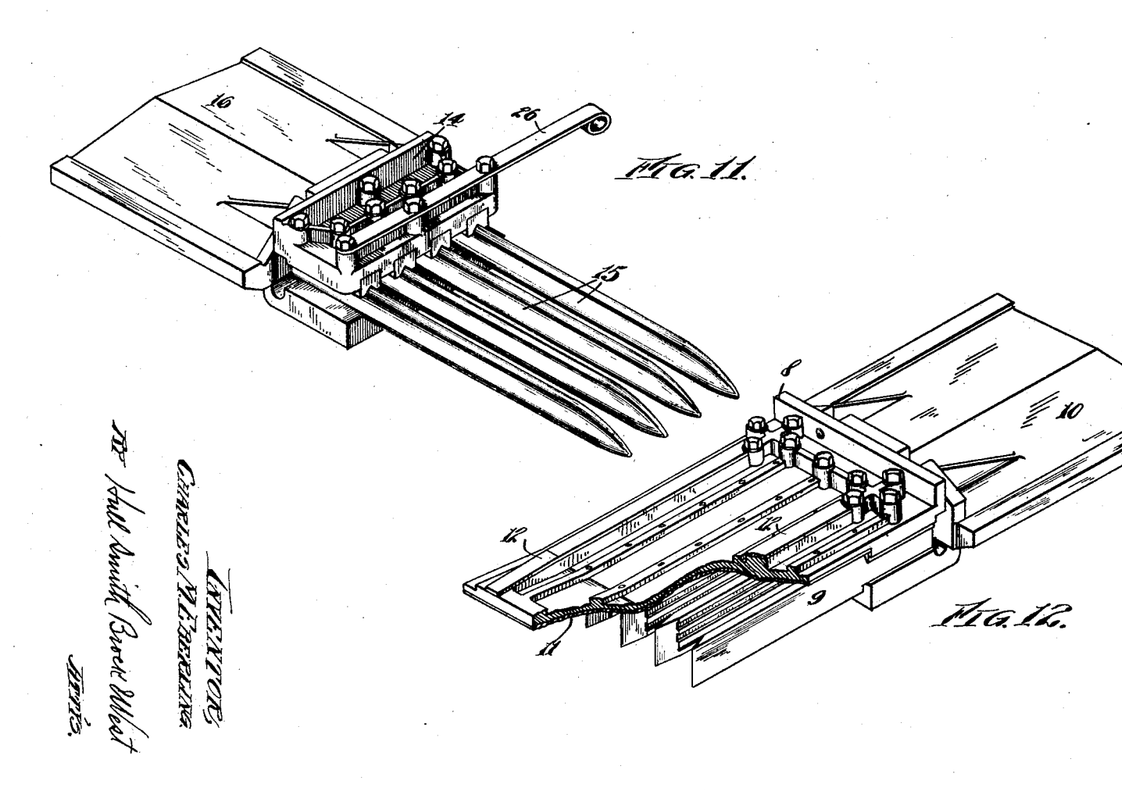
Fig. 11 is a perspective view of the plunger-head and its plungers.
Fig. 12 is a perspective view of the knife-head with its knives and cover.

Mounted in the slideway 3—3 is a second crosshead 14 from whose forward side project the spaced parallel piercing elements such as the plungers 15—15, and from whose rearward side projects the steadying plate 16. All these piercing elements are provided with tapered forward ends as shown in Figs. 11 and 12 and are arranged so that the elements on the one side fall between the elements on the opposite side as described and claimed in my earlier patents. In the particular embodiment here shown all the elements 9 are of the full thickness of the mold space, thus producing a number of small tiles each with a single hole therethrough, but it is equally within my invention to form some or all of these elements of smaller size so as to pierce the material without severing the same, or to increase the width of some or all the elements 15, so as to sever the material into small units instead of merely piercing the same, as clearly disclosed in my earlier patents.

Figure 1:
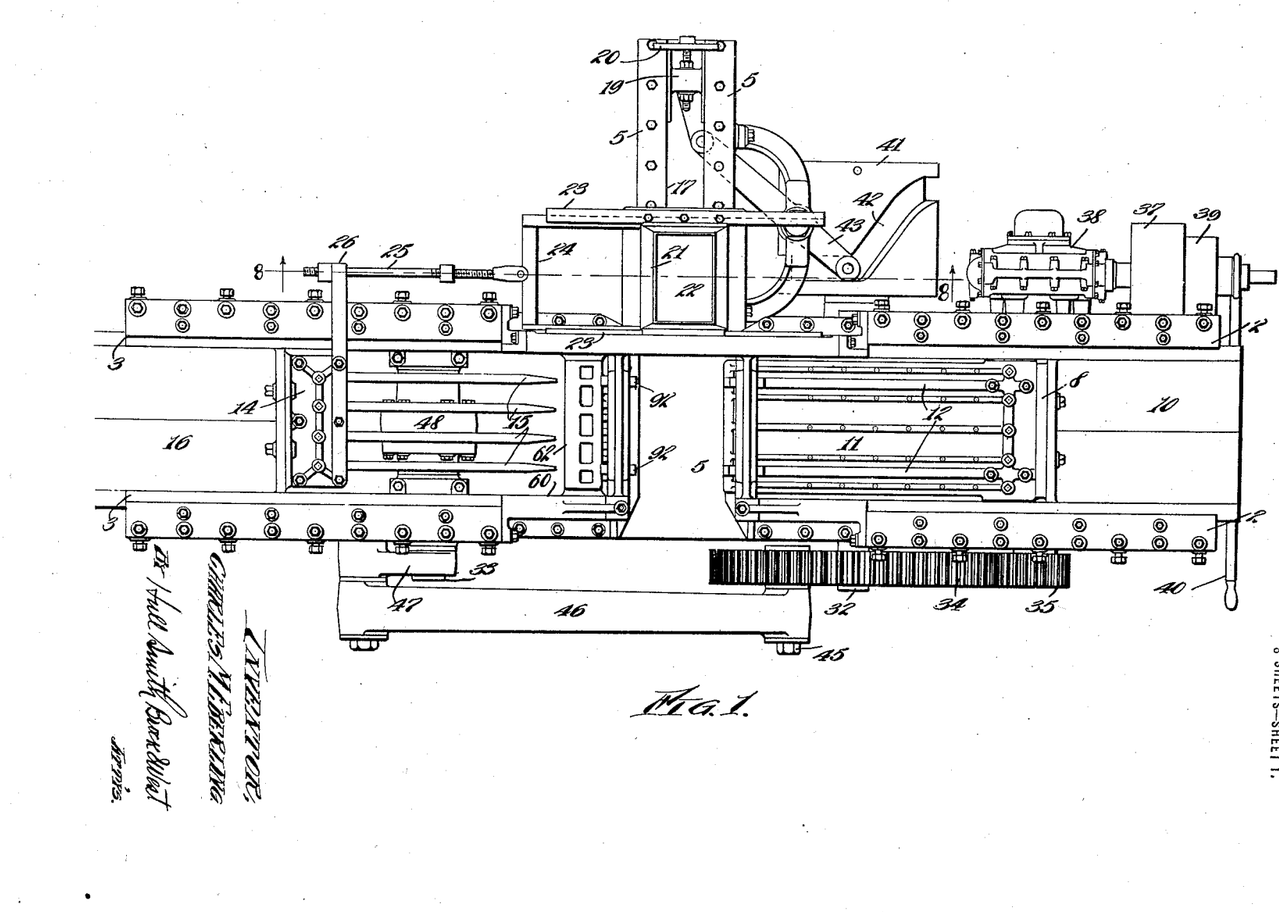
Fig. 1 is a top plan view of the complete machine.
Figure 3:
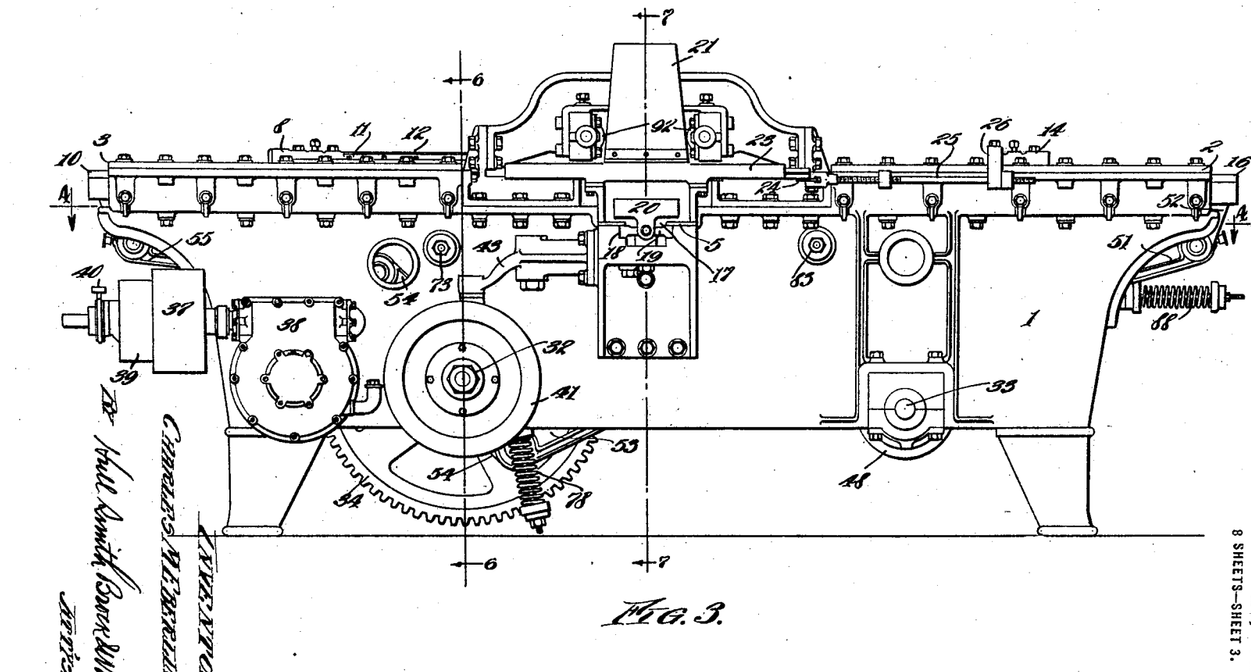
Fig. 3 a rear elevation.
Figure 4:
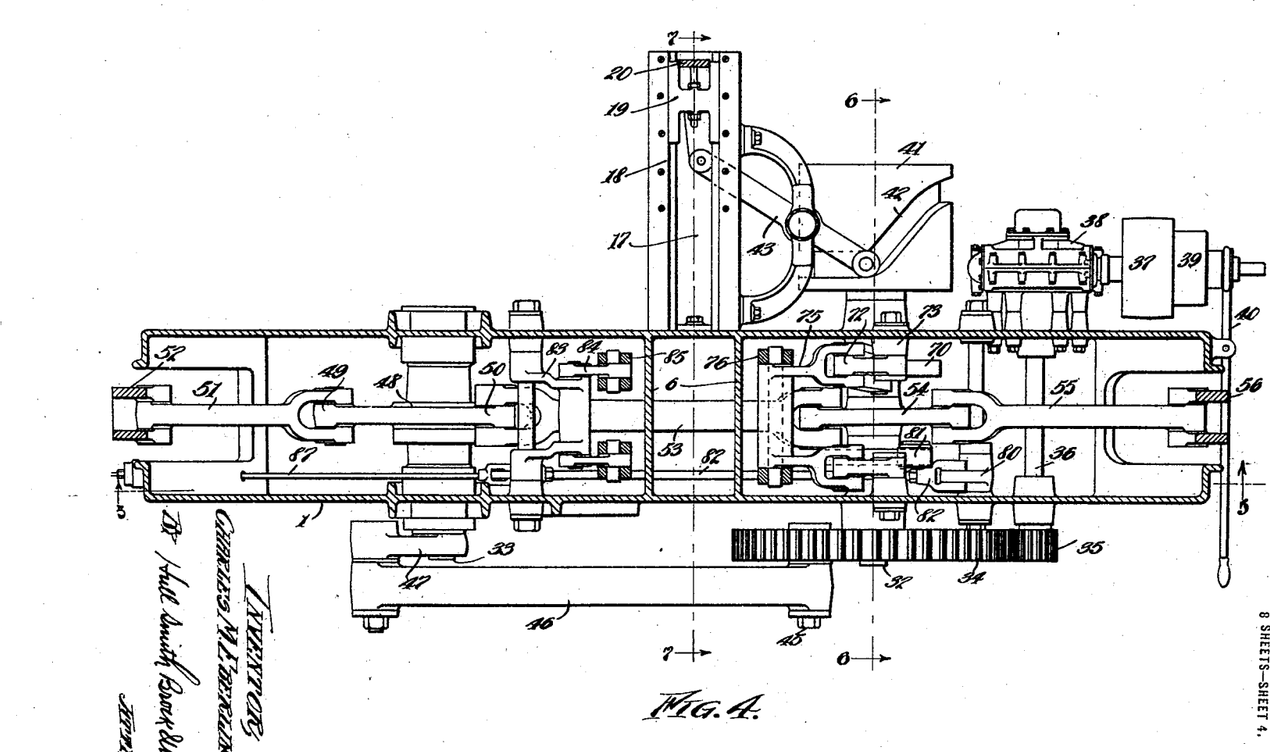
Fig. 4 a sectional view corresponding to the line 4—4 of Fig. 3 and looking downwardly.
Figure 5:
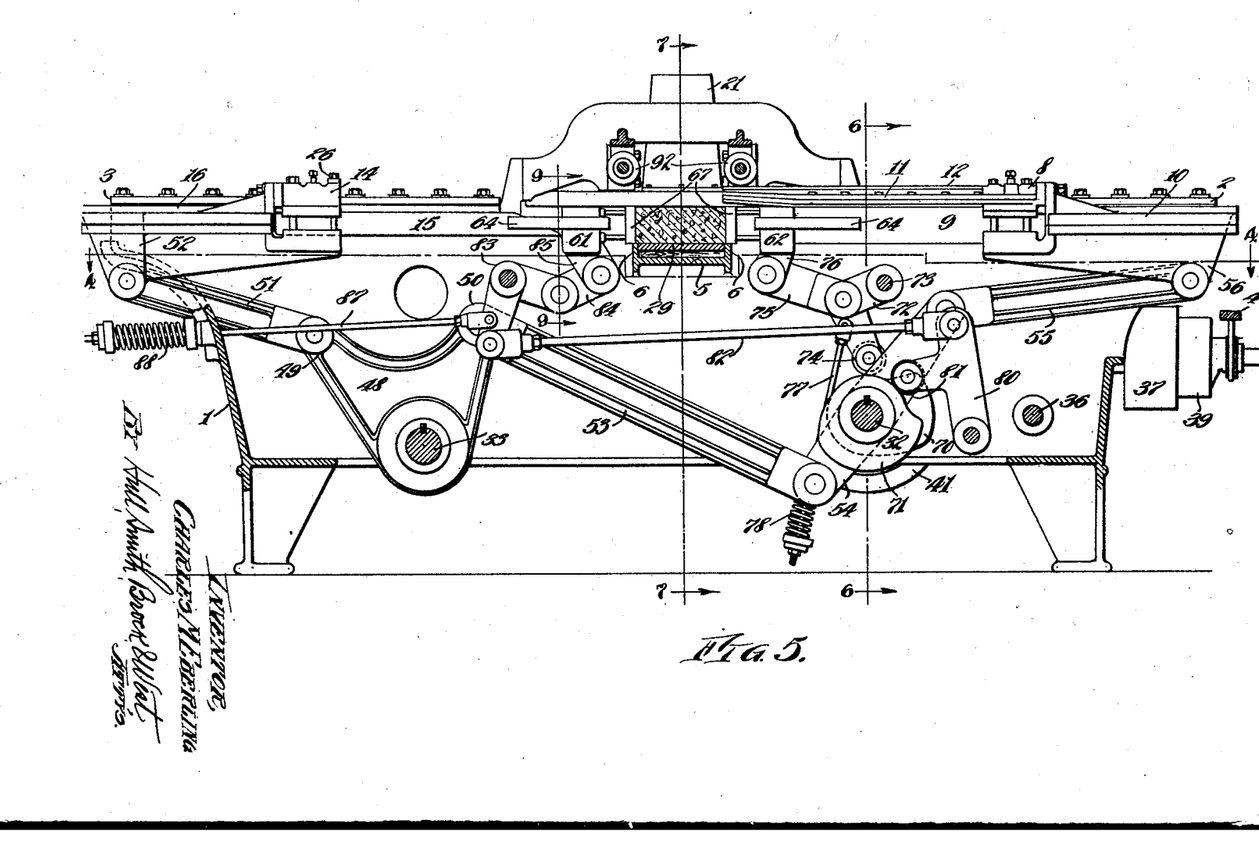
Fig. 5 is a sectional view taken upon the line 5—5 of Fig. 4, looking in the direction of the arrows.
Figure 7:
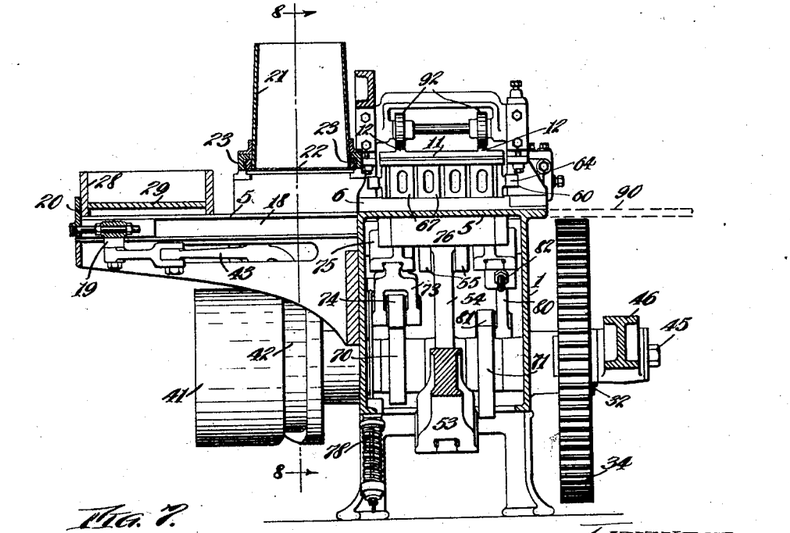
Figure 8:
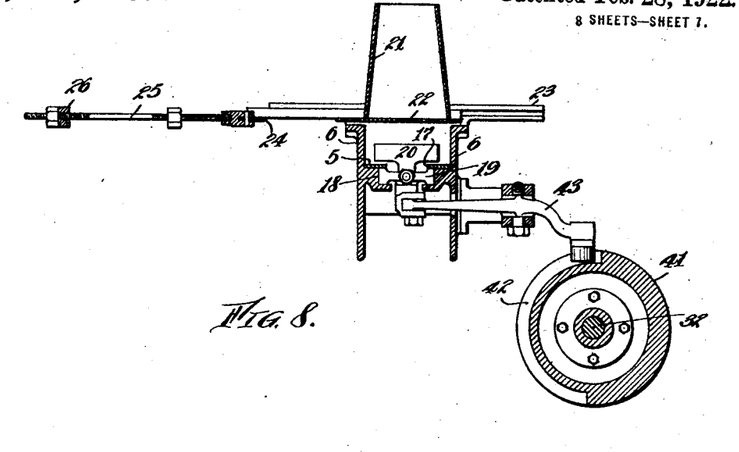
Fig. 8 is a detail view taken on the line 8—8 of Fig. 7.

At the rearward side of the machine the plate 5 projects laterally a considerable distance as shown in Figs. 1 and 7, being there formed with the longitudinal slot 17, beneath which is provided a slideway 18 in which is mounted a cross-head 19 which carries the pusher plate 20 which projects upwardly through the slot 17. Mounted above the plate 5 at the rearward side of the machine is a hopper 21 whose bottom is closed by a sliding plate 22 arranged to move in suitable ways 23 in a direction parallel to the slideways 2 and 3, said plate being formed at one point with an aperture 24 to permit it to function as a valve. One end of this plate is connected by means of a rod 25 with a rigid arm 26 carried by the cross-head 14. The distance between the plates 5 and 22 is sufficient to permit the passage therebetween of suitable pallets, each of which has end walls 28 and a bottom 29, as shown in Figs. 5 and 7. The height of this bottom 29 is such that the severing elements 9 will pass closely thereover, while the piercing elements 15 are elevated sufficiently thereabove so as to pass freely thereover.

Journaled in the frame 1 are two transverse horizontal shafts 32, 33 located beneath the slideways 2 and 3, respectively. Secured to the forward end of the shaft 32 is a gear-wheel 34 meshing with the pinion 35 carried by the drive-shaft 36 which receives its motion from a belt-pulley 37 through the medium of a worm-gear (not shown) contained in the case 38. For controlling the operation of the machine I have illustrated a suitable clutch 39 associated with said belt-pulley and operated by a hand-lever 40. To the rearward end of the shaft 32 is attached the cylindrical body 41 having in its surface the cam-groove 42 which cooperates with the lever 43 to operate the cross-head 19 at the proper periods. The forward face of the gear 34 carries a wrist-pin 45 on which is pivoted the connecting-rod 46 whose opposite end is articulated to the free end of a crank 47 rigidly attached to the shaft 33. The throw of the pin 45 is less than the length of the crank 47 so that while the former rotates the latter will only oscillate.

Rigidly secured to the shaft 33 inside the limits of the machine frame is a bell-crank lever 48 having two angularly spaced arms 49 and 50, respectively. To the arm 49 is articulated the drag-link 51 whose opposite end is connected to a depending bracket 52 carried by the plate 16. To the arm 50 is articulated the connecting-rod 53 whose opposite end is attached to one end of a lever 54 loosely journaled on the shaft 32, the opposite end of said lever being connected through the drag-link 55 to an ear 56 which depends from the plate 10. So far as the lever 54 is concerned, the shaft 32 merely constitutes a pivot, the fact that it is independently rotatable being immaterial.

Figure 9:
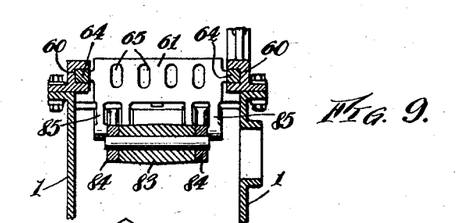
Fig. 9 is a detail sectional view taken upon the lines 9—9 of Fig. 5.
Figure 10:
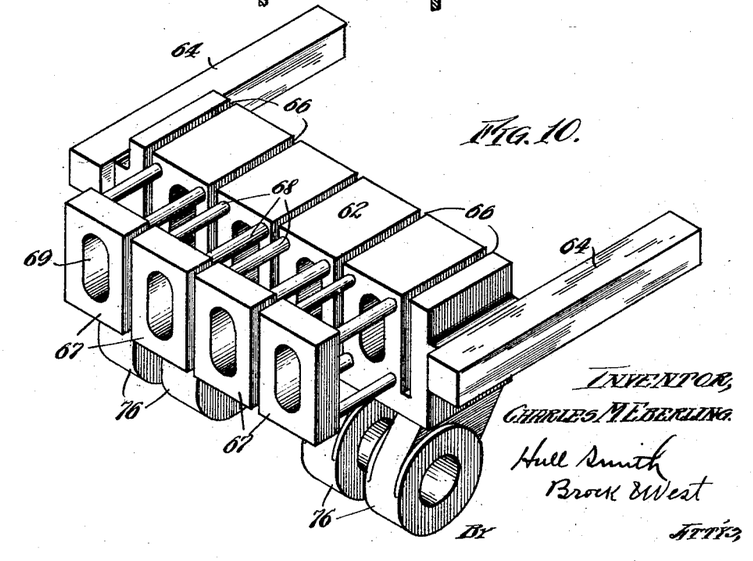
Fig. 10 is a perspective view of one of the compression heads.

Carried by the machine frame at each side of the plate 5 are additional slideways 60—60 which are parallel to the slideways 2, 3, and which may, if desired, constitute a part of those slideways, forward of the respective cross heads. Located upon opposite sides of the plate 5 are the transverse headers 61, 62, respectively, each of which is provided at its ends with longitudinal slides 64—64 which fit the respective slideways 60—60. The header 61 consists of a metal beam having apertures 65—65 therethrough (see Fig. 9) adapted for the reception of the elements 15—15; the header 62 consists of a similar beam having slots 66 for the reception of the elements 9—9. The height of the respective headers is such that the cover plate 11 will just clear the same as shown in Fig. 5.

Secured to the adjacent faces of the headers 61 and 62 are the header-blocks 67—67, which are rigidly supported and spaced from their respective headers by posts 68. Each of these header-blocks is formed with an aperture 69 for the reception of one of the piercing elements 15 and its edge is spaced from the adjacent header an amount sufficient to permit the passage of the severing elements 9, while its height is the same as that of the latter elements.

Rigidly secured to the shaft 32 are the cams 70—71, one at each side of the lever 54. A bell-crank lever 72 has one of its arms pivoted to the machine frame at 73 and has at its other end a roller 74 running on the cam 70, the knee of said lever having articulated thereto a link 75 whose opposite end is connected to the ear 76 which depends from the header 62. With the arrangement shown in Fig. 5 it will be seen that when the roller 74 is lifted by the cam 70, the toggle will be straightened and the header 62 advanced. In order to break this toggle and retract the header I provide a pull-rod 77 and spring 78. Pivoted at one side of the shaft 32 is a lever 80 having a roller 81 which runs against the cam 71 and has articulated to its free end the rod 82. Pivoted above the shaft 33 is a bell crank lever 83 one of whose arms is connected to the rod 82 and the other of whose arms is connected by means of a link 84 to a finger 85 which depends from the header 61. Upon the displacement of the lever 80 by the cam 71 this toggle is straightened and the header advanced. The breaking of the toggle and retraction of the header is accomplished by the pull-rod 87 and spring 88.

For the best operation of the machine it is necessary that, starting from the condition shown in these drawings wherein the severing and piercing elements are both retracted, the cross-head 8 should first be advanced so as to enclose the mold space by the cover 11 and also project the corresponding piercing elements through the mold space; the terminal elements pass just inside the ends 28, 28 of the pallet so as to withstand the compression pressure. When all these elements are knives, the plastic material will be severed into small units. After this advance it is desirable that the cross-head 8 should remain in advanced position until the opposite elements have been completely advanced and at least partially withdrawn. During the time that the knives and plungers are in their most advanced position, it is also desirable to advance the header blocks 67—67, both for the purpose of exerting an additional compression effect upon the material and also to produce such a clearance by the subsequent retraction of those blocks as to prevent danger of any disruption of the finished tiles upon the ejection of the pallet. When this movement of the headers is employed it is also desirable that the headers which lie upon the same side as the knives should not be withdrawn until the knives are substantially free from the material, inasmuch as the knives are generally flat sided and capable of exerting a continuous friction effect upon the blocks, while the other elements can be withdrawn, if desired, very shortly after the plungers have been released, owing to the fact that the latter are generally slightly tapered.

All these conditions are fulfilled by the mechanism here shown through the medium of the following arrangement and operation: Each revolution of the shaft 32 determines the formation and ejection of a pallet-load of tile. Starting with the parts in the relation shown in the drawings. the rotation of the wheel 34 in the direction shown by the arrow will first cause a forward rocking of the crank 47 and bell crank 48. At the beginning of the stroke the arm 50 is substantially at right angles to the drag-link 53, as a consequence of which the elements 9 and cover 11 are advanced very rapidly, while the obliquity of the arm 49 relatively to its connecting rod 51 causes the elements 15 to advance comparatively slowly. As a result of this, the cover plate is enabled to move completely across the mold space by the time the opposite elements enter the same, while at the same time the progression of this movement reverses these angular relations, increasing the speed of the elements 15, and decreasing the speed of the elements 9 until in the position shown in dotted lines in Fig. 13, the latter have been brought completely to rest. At this instant the lever arm 49 is subsantially perpendicular to the drag-link 51 and the wrist pin 45 is approaching its dead center. Preferably the arrangement of the levers 47 and 48 is such that the arm 50 moves slightly beyond dead center as shown in Fig. 13, which produces, first a slight retraction of the knives and then a slight advance thereof prior to their movement of complete retraction. The cams 70 and 71 are so adjusted relatively to their rollers 74 and 81 that the advancing movement of the headers will occur at the time of greatest advance of the piercing and severing elements. The continued forward rotation of the gear 34 first causes the elements 15 to be retracted while at the same instant the elements 9 are first advanced very slightly and then retracted, slowly at first and then with increasing speed until the mold-space is entirely freed therefrom. At this instant the cam groove 42 operates to shift the lever 43 and advance the pusher 20, thereby introducing an empty pallet beneath the hopper, advancing the pallet which was previously beneath the hopper (and which became filled with plastic material therefrom upon the opening of the valve caused by the previous advance of the cross-head 14) into the mold space, which in turn serves to eject the pallet with its completed blocks upon a receiving apron 90, shown in dotted lines in Fig. 7. The cams 70 and 71 are so arranged as to advance the headers 61 and 62 substantially at the time of maximum advance of cross-heads 8 and 14. The cam 70, however, is preferably made of less angular extent than the cam 71 so that the header 61 will be withdrawn comparatively quickly while the profile and angle of the cam 71 are so chosen that the header 52 will not be withdrawn until the corresponding elements have been nearly or quite withdrawn. The cover 12 is held against the bursting pressure by means of rollers 92—92 carried by the frame and engaging the rollway 12—12.

It will be understood that many changes in details and arrangement can be made without departing from my invention which is defined only by the prior art and the claims hereto annexed.

Having thus described my invention, what I claim is:—

1. In a device of the character described, the combination with a support for plastic material, of two mechanisms located upon opposite sides thereof and adapted to operate on such material, a bell crank lever, connecting rods connected to the arms of said lever and having their opposite ends operatively connected to said mechanisms respectively, and means for oscillating said lever, the angle between said arms and their respective connecting rods being such that one of said mechanisms will be moved to and held in operating position during the time that the other mechanism is being advanced and retracted, whereby said mechanisms are caused to operate successively.

2. In a device of the character described, the combination with a support for plastic material, of two mechanisms located upon opposite sides thereof and adapted to operate on such material, a bell crank lever, connecting rods connected to the arms of said lever and having their opposite ends operatively connected to said mechanisms respectively, and means for oscillating said lever, the angle between said arms being such that each of the same will be moved from a position of quadrature to that of substantially dead center as respects its connecting rod during the time that the other arm is moved from substantial dead center to substantial quadrature, whereby said mechanisms are caused to operate successively.

3. In a device of the character described, the combination with a support for plastic material of two dissimilar reciprocatory mechanisms adapted to operate upon such material, a pair of parallel shafts journaled perpendicularly to the direction of movement of said mechanisms, means for rotating one of said shafts, operative connections between said shafts whereby the other shaft will be oscillated upon such rotation, a pair of arms carried by said other shaft, and link-connections between each arm and one of said mechanisms, said levers being mounted at an angle to each other whereby said mechanisms will be operated in a different phase.

4. In a device of the character described, the combination with a support for plastic material of two reciprocatory mechanisms adapted to operate upon such material, a shaft journaled transversely of the direction of such reciprocation, a pair of arms carried by said shaft and making an oblique angle relatively to each other, link-connections between each arm and one of said mechanisms, and means for oscillating said shaft, so as to bring said arms, one into line and the other into quadrature with their respective links.

5. In a device of the character described, the combination with a support for plastic material of two reciprocatory mechanisms adapted to operate upon such material, a shaft journaled transversely of the direction of such reciprocation, a pair of arms carried by said shaft, link-connections between each arm and one of said mechanisms, and means for oscillating said shaft, said arms projecting from said shaft at such an angle to each other and to their respective connections that one of said arms during its oscillation will pass the dead center of its link-connection at substantially the same time that the other arm comes into quadrature with its link connection.

6. In a device of the character described, the combination with a support and means for moving pallets containing plastic material intermittently along said support, of two reciprocatory mechanisms adapted to operate upon such material, a shaft perpendicular to the direction of such reciprocation, a pair of diverging arms carried by said shaft, link devices connecting each of said arms to one of said mechanisms, and means for oscillating said shaft, said arms being arranged so that one of them will pass beyond the dead center of its corresponding link-connection at each oscillation, and one of said link devices comprising a reversing lever whereby both mechanisms may be operated simultaneously.

7. In a device of the character described, the combination with a support for plastic material, of two reciprocatory mechanisms adapted to operate upon such material, a shaft perpendicular to the direction of such reciprocation, a rock-lever journaled on an axis parallel to said shaft, a pair of arms carried by said shaft, a connecting rod between one of said arms and one end of said rock-lever, and links attached to said mechanisms and attached, the one to the other of said arms and the other to the opposite end of said lever.

8. In a device of the character described, the combination with a support for plastic material, of two reciprocatory mechanisms adapted to operate upon such material, a shaft perpendicular to the direction of such reciprocation, a rock-lever journaled on an axis parallel to said shaft, a pair of arms carried by said shaft, a connecting rod between one of said arms and one end of said rock-lever, and links attached to said mechanisms and attached, the one to the other of said arms and the other to the opposite end of said lever, the angle between said arms being such that one is in line with its attached member while the other is substantially perpendicular to its member.

9. In a device of the character described, the combination with a support for plastic material, of two reciprocatory mechanisms adapted to operate upon such material, a pair of parallel shafts perpendicular to the direction of such reciprocation, a pair of diverging arms rigid with one of said shafts, a rock-lever loosely mounted on the other shaft, a connectng rod between one of said arms and one end of said lever, a link attached to each mechanism and connected, one to the other arm and the other to the opposite end of said lever, means for rotating the shaft on which said lever is mounted, and connections between said shafts whereby the other shaft is rocked upon such rotation.

10. In a device of the character described, the combination with a support for plastic material, of two reciprocatory mechanisms adapted to operate upon such material, a pair of parallel shafts perpendicular to the direction of such reciprocation, a pair of diverging arms rigid with one of said shafts, a rock-lever loosely mounted on the other shaft, a connecting rod between one of said arms and one end of said lever, a link attached to each mechanism and connected, one to the other arm and the other to the opposite end of said lever, means for rotating the shaft on which said lever is mounted, and connections between said shafts whereby the other shaft is rocked upon such rotation, and cam-means carried by said rotating shaft adapted to perform yet another operation upon said plastic material.

11. In a device of the character described, the combination with means for supporting plastic material, of header members movably supported upon opposite sides thereof and having apertures, cutting and piercing mechanisms located upon the opposite sides of such supporting means outside of said headers and adapted for advance and retraction through the apertures thereof, a pair of parallel shafts, a rock-lever loosely mounted on one of the shafts, a pair of diverging arms rigidly mounted on the other shafts, a link operatively connected to each of said cutting and piercing mechanisms, the opposite ends of said links being connected, one to said lever and one to one of said arms, means connecting the other arm to the opposite end of said lever, means for rotating the shaft on which said lever is mounted, means connecting said shaft to the other shaft adapted to oscillate the latter upon each rotation of the former, and cam-means on said first shaft adapted once in each revolution to advance said headers toward said plastic material and then withdraw the same.

In testimony whereof, I hereunto affix my signature.

CHARLES M. EBERLING.